United States Patent [19]

Nishi et al.

[11] 4,317,186
[45] Feb. 23, 1982

[54] DEVICE FOR DETERMINING THE POSITION OF A SOUND SOURCE

[75] Inventors: Isao Nishi, Osaka; Hiroyasu Nakasa, Tokyo, both of Japan

[73] Assignee: Nihon Etl Kabushiki Kaisha, Osaka, Japan

[21] Appl. No.: 97,916

[22] Filed: Nov. 28, 1979

[30] Foreign Application Priority Data

Dec. 23, 1978 [JP] Japan .................. 53-159459

[51] Int. Cl.$^3$ .............................................. G01S 7/52
[52] U.S. Cl. ...................................... 367/127; 367/125
[58] Field of Search ............... 367/122, 125, 127, 129, 367/907; 73/587

[56] References Cited

U.S. PATENT DOCUMENTS

3,875,381 4/1975 Wingfield et al. ............... 367/127 X
4,009,463 2/1977 Vercellotti et al. .................. 367/127

*Primary Examiner*—Richard A. Farley
*Attorney, Agent, or Firm*—Koda and Androlia

[57] ABSTRACT

A device for determining the position of a sound source includes a plurality of sensors disposed on an object for which the sound source is to be detected and organized in the form of a matrix with N rows and M columns. The sensors are connected in parallel through respective uni-directional transmission elements with a common terminal for each row and each column. A signal processing circuit amplifies and carries out a designated output waveform generation process on detected signals produced by the sensors. Means are also included for identifying the order of detection by each sensor on the basis of the phase differences of the generated output waveform signals, for determining among the output signals from the common terminals of each row and each column a signal with identical phase, for identifying a common terminal from which the signal with the identical phase was transmitted, and for identifying the sensor which produced the detected signal from the identification of the row and column which transmitted the detected signal with the identical phase, whereby the position of the sound source may be determined from the position of each of the sensors and the order of detection.

5 Claims, 20 Drawing Figures

DEVICE FOR DETERMINING THE POSITION OF A SOUND SOURCE

BACKGROUND OF THE INVENTION

1. Field of Invention

The present invention relates to devices for locating the source of sound waves or acoustic emission and in particular for determining the location of a sound source of sound waves or acoustic emission emitted from a structure.

2. Prior Art

Locating the source of sound, etc. can be accomplished from the difference in time which a sound wave takes to reach a plurality of sensors. One of such conventional devices is described in the following example and in such example the determination of the acoustic emission (hereinafter abreviated as AE) such as elastic waves generated when a solid body is deformed or breaks is made so that the breaking of the body can be predicted and data can be used for research in the science of materials.

Figure 1:
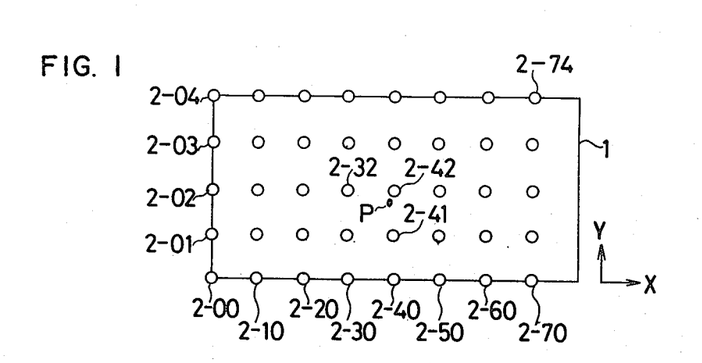
FIG. 1 is a folded out view of large tank with sensors distributed on its side wall.
Figure 2:
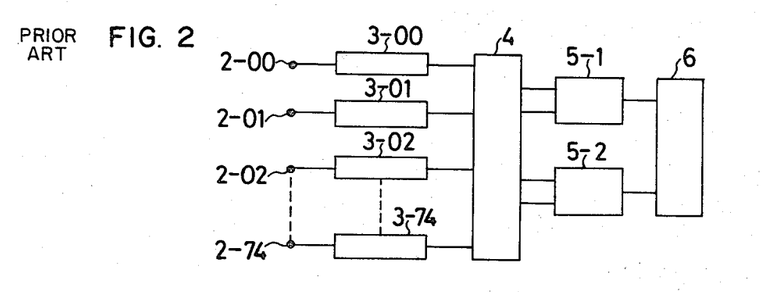
FIG. 2 is a block diagram of a prior art device for determining the position of a sound source.

In FIG. 1 is shown a folded out view of a large tank with sensors 2 distributed on side wall 1 of the tank. The symbols attached to each sensor indicates the address of the sensor. There are eight sensors in the direction of the x-axis and five sensors in the direction of the y-axis or all together forty sensors distributed in the form of a matrix. In FIG. 2 is shown a block diagram of a conventional device which includes a processing circuit 3 containing an amplifier and a shape forming circuit. A detected signal from the sensor 2 is applied to the signal processing circuit 3 and converted into a pulse signal having a peak magnitude as well as a detection time. The conventional device further includes a computation circuit 4 which identifies the order in which each sensor has received the AE signal on the basis of the phase difference of the input signal. At the same time, the computation circuit combines the first and second signals in order of detection as well as the first and third signal in order of detection and sends these as an output to time difference measurement circuits 5-1 and 5-2 wherein the detection time difference of each sensor 2 is measured.

Figure 3:
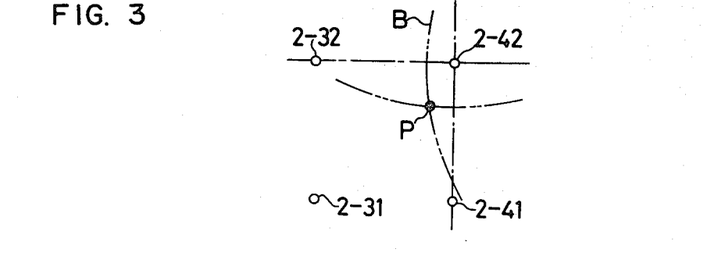
FIG. 3 is a diagram explaining the method of locating the sound source from the data in a conventional device.

Shown in FIG. 3 is a diagram for explaining the method of locating the AE source from the data. The determination is made as the crossing point of two hyperbolas, one of which is the trajectory A of the point at which the time difference is constant between the signal receiving sensor at the first position 2-42 and the signal receiving sensor at the second position 2-41 and the other of which is the trajectory B of the point at wich the time difference is constant between the signal receiving sensor at the first position 2-42 and the signal receiving sensor at the third position 2-32.

In a conventional device constructed as described above each sensor 2 is always in contact with a signal processing circuit 3. Since the AE is a weak sound wave, the sensor's possible range of detection is only on the order of 1 to 2 meters even in the case of steel materials. If the object is a large structure, it is necessary to distribute a large number of sensors and it becomes necessary accordingly to have a position locating device equipped with a multi-channel signal processing circuit. When the object of measurement is a water reservoir dam, for example, the necessary number of sensors may be a large as tens of thousands. Thus, the real world utilization of the conventional devices is extremely difficult and expensive.

SUMMARY OF THE INVENTION

Accordingly, it is a general object of the present invention to provide a device for determining the position of sound source.

It is another object of the present invention to provide a device for determining the position a sound source wherein the number of processing channels is substantially reduced.

In keeping with the principles of the present invention, the objects are accomplished by a unique device for determining the position of a sound source. The device includes a plurality of sensors arranged and indexed on the object for with the sound source is to be detected in the form of a matrix which N rows and M columns and each of the sensors is connected in parallel through a respective preamplifier or other uni-directional transmission element with a common terminal for each row and each column, a signal processing circuit which amplifies and carries out a designated output waveform generation process on detected signals produced by the sensor, a means for identifying the order of detection by each sensor on the basis of the phase differences of the output waveforms, a means for determining among the output signals from the common terminal from which the signal with the identical phase was transmitted and a means for identifying a sensor which produced the detected signals from the determination of the row and column which transmitted the detected signal with the identical phase whereby the position of the sound source is determined from the position of each of the sensors and the order of detection.

BRIEF DESCRIPTION OF THE DRAWINGS

The above-mentioned features and objects of the present invention will become more apparent with reference to the following description taken in conjunction with the accompanying drawings wherein like reference numerals denote like elements and in which.

DETAILED DESCRIPTION OF THE INVENTION

Figure 4:
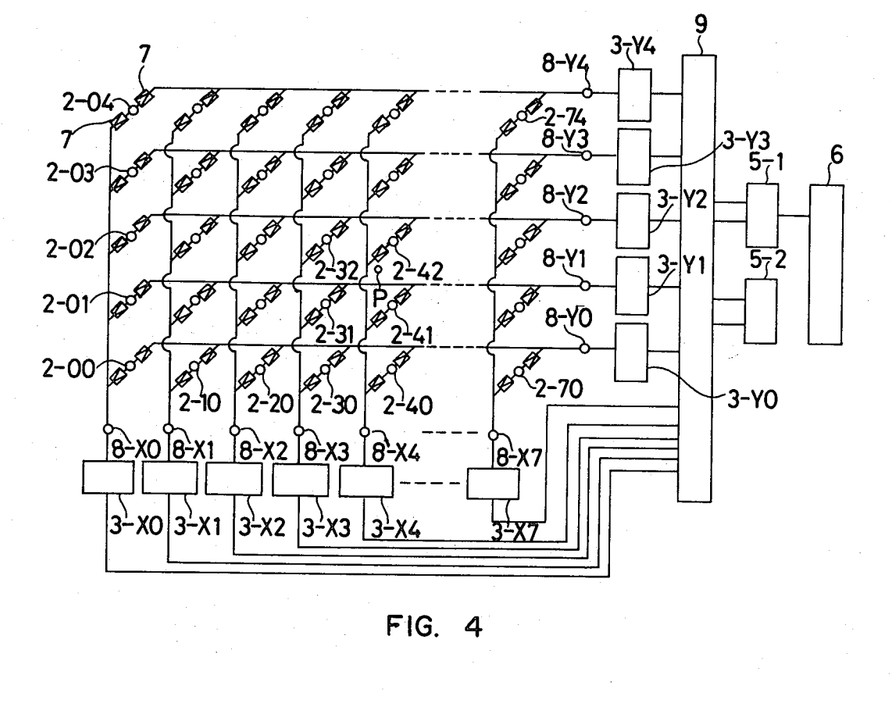
FIG. 4 is a block diagram illustrating the teachings of the present invention applied to the side wall of the tank of FIG. 1.

Referring more particularly to the figures, shown in FIG. 4 is a block diagram of one example of the present invention applied to a side wall 1 of a tank. In FIG. 4, the device includes signal processing circuits 3-x0 through 3-x7 and 3-y0 through 3-y4, a plurality of preamplifiers 7, common terminals 8-x0 through 8-x7 and 8-y0 through 8-y4, a micro-computer 9 containing a program and forty sensors 2-00 through 2-74 classified into rows and columns with each of the sensors belonging to the same row (the same y-coordinate) connected in parallel to a common terminal 8 through its respective uni-directional preamplifier 7 and each of the sensors belonging to the same column (with the same x-coordinate) connected in parallel to the common terminal 8 through its respective uni-directional preamplifier 7. By means of a classification scheme of this type, the sensor with address (ij) sends out a detection signal to the common terminals 8-xi and 8-yj and this enables the identification of the signal receiving sensor 2 by identifying the signal with identical phase. The micro-computer 9 identifies the detection order of the sensors by receiving an input signal from the signal processing circuit 3. At the same time, the micro-computer 9 combines the output waveform signals from the first and second addresses and from the first and third addresses and sends them out to the time difference measurement circuits 5-1 and 5-2.

Figure 5:
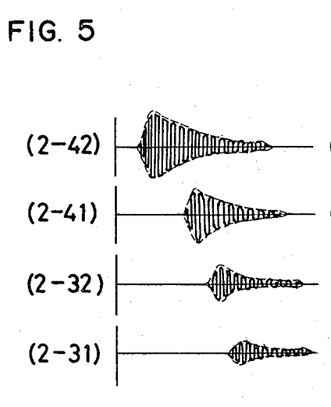
FIG. 5 illustrates the wave shapes of signals detected by the sensors which are near the sound source.
Figure 6:
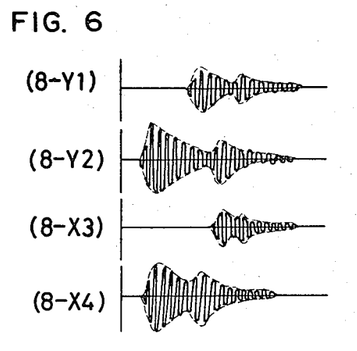
FIG. 6 illustrates the wave shapes of detection signals produced by the common terminals connected to the sensors near the sound source.
Figure 7:
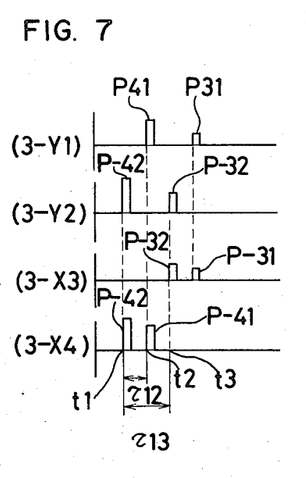
FIG. 7 illustrates the wave shapes of the output signal waveforms produced by the signal processing circuit.

FIG. 5 illustrates the waveforms of detection signals of sensors 2-42, 2-41, 2-32 and 2-31 which are assumed to be near the source P of the AE. FIG. 6 illustrates the waveforms of the detection signals produced by common terminals connected to the sensors 2-42, 2-41, 2-32 and 2-31. FIG. 7 illustrates the waveforms of the output signals produced by the signal processing circuit. Signal P42 displays the time of receiving the detection signal by sensor 2-42 and level of the detected signal. Similarly, P41, P32 and P31 respectively display the receiving of detection signals and their sensor levels 2-41, 2-32 and 2-31. The micro-computer 9 selects and takes out of these detection signals the system that contains the first through third output waveform signals P42, P41 and P32 and indentifies the sensor on the basis of the address which sent out each of these detection signals and sends the address of these sensors and the order of reception to the recording device 6. The micro-computer also combines the output waveform signal P42 of the first location and the output waveform signal P41 of the second location in order to output it to the time difference measurement circuit 5-1 and combines the output waveform signal P42 of the first location and output waveform signal P32 of the third location in order to output it to the time difference measurement circuit 5-2. the time difference measurement circuits 5-1 and 5-2 calculate the difference in detection time between the response of respective sensors on the basis of the input time differences $r_{12}$ and $r_{13}$ and provides an output to the recording device 6. On the basis of this data thus recorded on the recording device 6 it is possible to determine the position of the AE source by the same method used in connection with the conventional devices.

Figure 8:
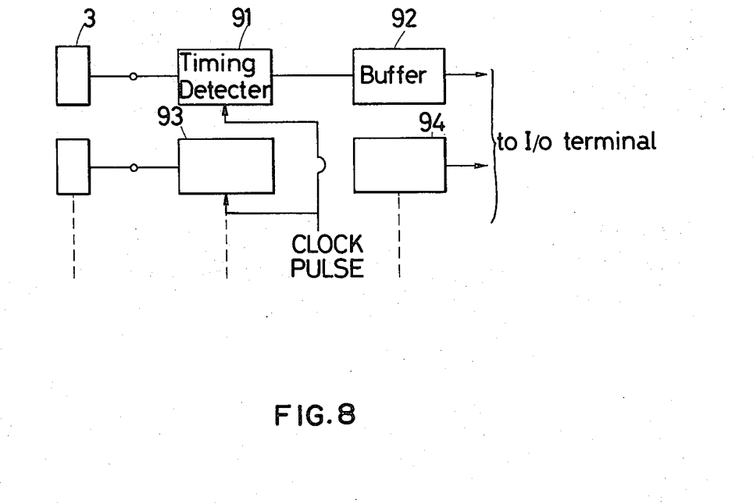
FIG. 8 illustrates a timing detector utilized in the present invention.

The micro-computer 9 used in the present invention has a processor with interrupt capabilities such as an InTel 8080A. Actually, the micro-computer 9 contains a processing circuit for the purpose of converting the pulse from the signal processing sequence elements. The timing detector is shown in FIG. 8 and the timing detector together with a buffer constitute the processing circuit. The timing detectors 91, 93, . . . convert the pulse signals (the signals shown in FIG. 7) for the signal processing circuit 3 into digital data containing time sequence elements in accordance with a clock pulse and stores them temporarily in the buffers in the next row 92, 94, . . . . All the other timing detectors and buffers function in the same way as described above and the input pulse signals are converted into digital data and temporarily stored in the buffers.

The data which is thus temporarily stored in the buffers can be processed by the micro-computer connected to the next row. In actual performance, the output from buffers 92, 94, . . . are connected to the data terminal of a input/output (I/O) chip.

Figure 9:
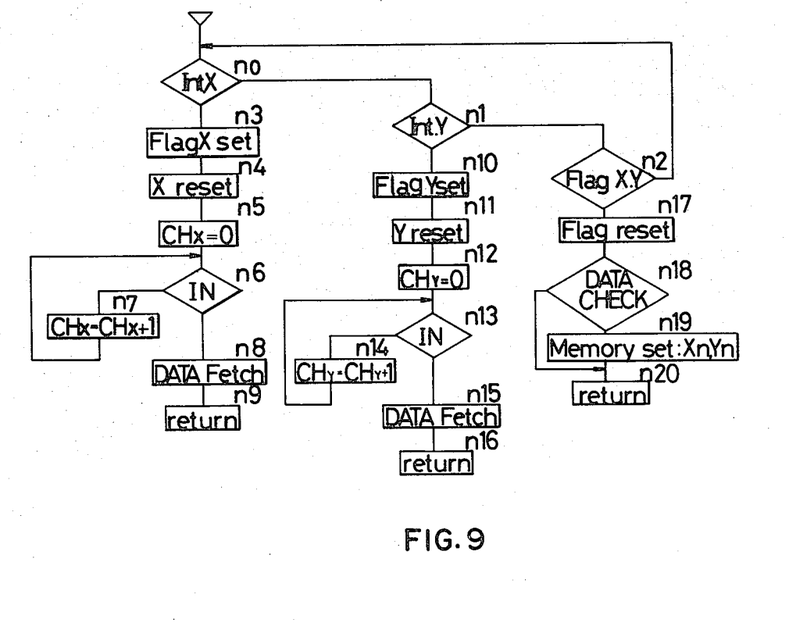
FIG. 9 is a flow chart illustrating the method of processing the data.

Referring to FIG. 9, shown therein is a flow chart of the processing procedure of the micro-computer 9 and the processing procedure of the micro-computer will be explained in connection with the FIG. 9. Under normal circumstances, or in the condition where AE signals are not being generated, the micro-computer 9 is in a waiting loop going through the steps $n_0, n_1, n_2, n_3, \ldots$. This is the state of constantly watching whether there has been an external interruption from the I/O chip or whether an AE signal has been generated and data has been set in any of the buffers 92, 94, . . . , or the state of constantly determining whether data has been taken inside the computer 9. Accordingly, if an interrupt signal is detected at $n_0$ at the same time, the flow will proceed to step $n_3$ and onward and the data generating channel of the signal processing circuit 3-xn of the x-line will be searched. Step $n_3$ is the step of setting up a flag which shows that the data generating channel of the x-line is going to be searched and that the data therein is to be fetched. The step $n_4$ is the step of clearing the memory area into which the above described data is to be stored. Steps $n_5$, $n_6$, and $n_7$ are steps for discovering the data-generating channel on the x-line. The step $n_8$ is the step of fetching the data discovered in the memory x. As soon as the step $n_9$ is reached, the computer 9 returns to the original waiting loop.

If it was an AE that caused the above described interrupt, the same AE signal must have been generated in some channel in the y-line. Accordingly, an interrupt must be generated from I/O chip connected to the channel of the y-line and as soon as the computer 9 returns to the waiting loop, the computer will proceed through the steps $n_1$ to $n_{10}$. This sequence $n_1$ to $n_{10}$ ... to $n_1$, like the sequence $n_0$ to $n_1$ . . . to $n_9$, is a routine for discovering the data generating channel of the y-line so as to fetch the data into the memory y. After the AE signal is converted into digital data and stored respectively in memory x and y and the flag x and y is consulted, the computer 9 proceeds from steps $n_2$ through $n_{17}$ and onward.

At step $n_{18}$ the stored data in memory x and y are examined to see if they agree. If they agree, they represent the AE signal and the computer 9 proceeds to step $n_{19}$ and the data is stored in the designated area. If the data does not agree, on the other hand, the data does not represent the AE signal and the computer 9 progresses from step $n_{18}$ to $n_{20}$ and then returns to the original waiting loop. The post data P41, P32 and P31 as shown in FIG. 7 is processed similarly. The micro-computer 9, following the sequence shown and described above processes the pulse signals from the signal processing circuit 3 (identification of AE signal and memory after data conversion included in the time sequence element) and the process data described above is outputed to the time difference measurement circuit 5 with the help of a timing circuit (not shown).

Figure 10:
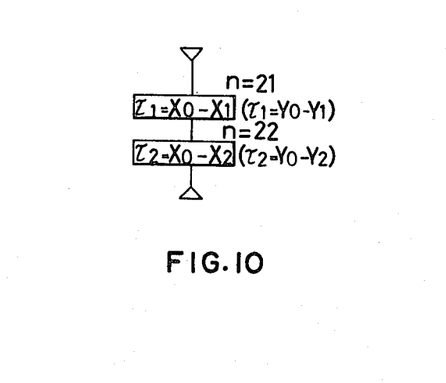
FIG. 10 is flow diagram illustrating the method of processing within the time difference measurement circuits.

Referring to FIG. 10, shown therein is the method of processing within the time difference measurement circuits 5-1 and 5-2. In this processing within a time difference measurement circuits 5-1 and 5-2, the step $n_{21}$ illustrates the processing inside the former measurement circuit 5-1 and step $n_{22}$ illustrates the processing within the later measurement circuit 5-2. Accordingly, time $\tau_1$ is measured in $n_{21}$ while the time $\tau_2$ is measured in the step $n_{22}$.

The peak of the signals generated in the channels shown in FIG. 6 for each of the sensors 2-42, 2-41, . . . shown in FIG. 4 can be detected. In real cases, however, such a signal is not always formed. For example, when a received signal at the second location is very close to the received signal at the first location, the peak of the received signal at the second location may not be found in the synthesized signal. In such a case, however, the signal at the first location can always be received and then the location of the second sound source can be roughly found according to the above described embodiment.

Figure 11:
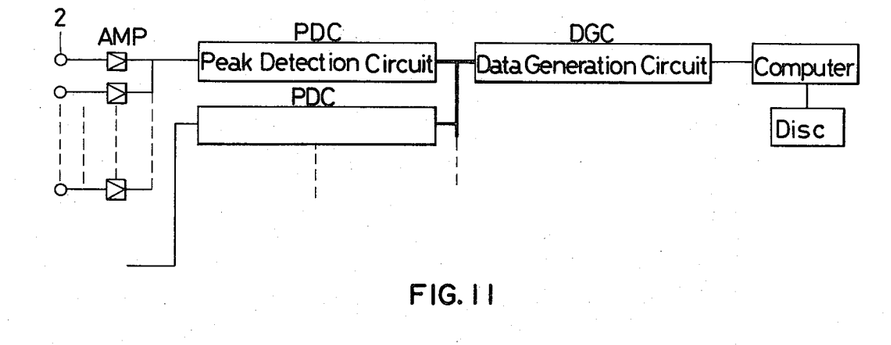
FIG. 11 is a partial block diagram of another example of a sound source location device according to the teachings of the present invention.
Figure 12A:
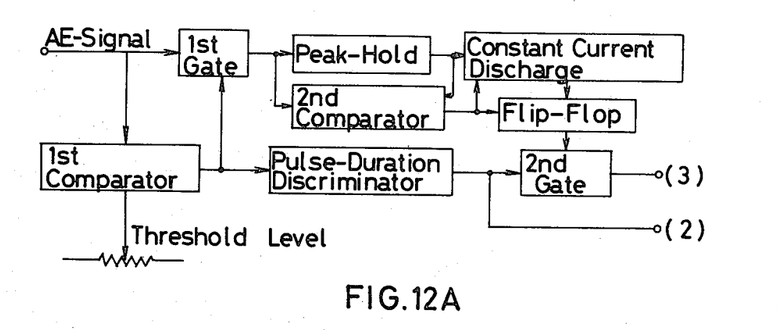
FIG. 12(A) is a block diagram of a peak detection circuit utilized in the present invention.
Figure 12B:
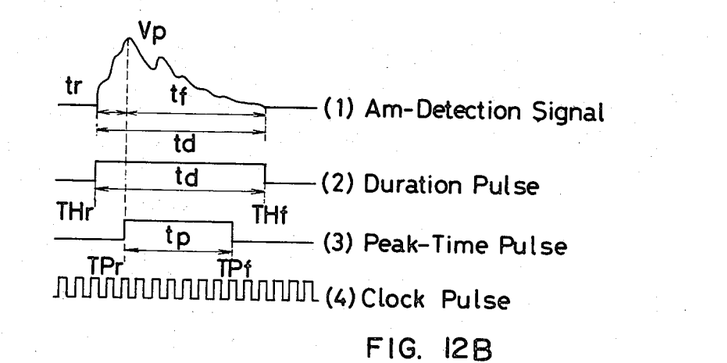
FIG. 12(B) illustrates the waveforms of detected sensor signals and internal clock signals at the input side and the output side of the peak detection circuit.
Figure 13:
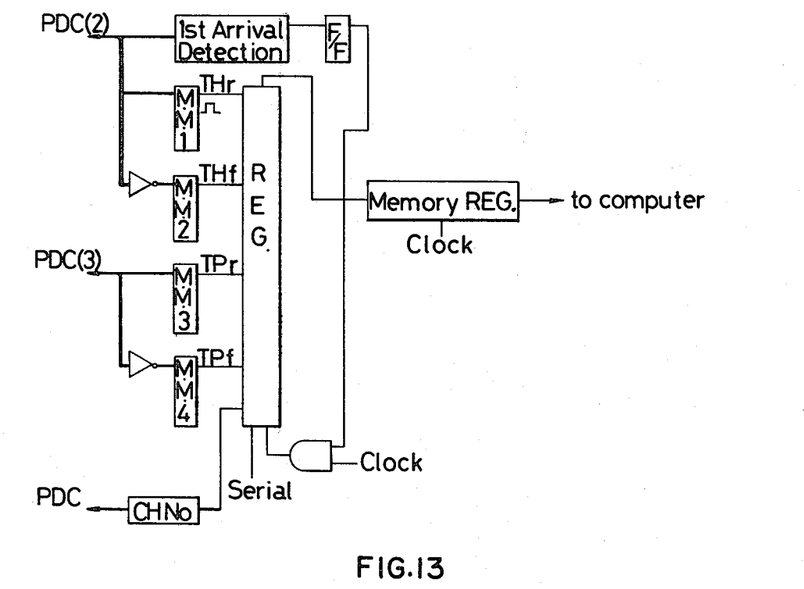
FIG. 13 is a block diagram of a data generation circuit utilized in the present invention.

Referring to FIGS. 11 through 13, shown therein is another embodiment of the present invention in which the peak of the received signal can be detected even when the signal at the first location is close to the signal at the second location. This embodiment utilizes the characteristic of the present invention in which the peak value, even if phases of signals are almost the same, should be detected as a rise signal in either the x-channel or y-channel by means of a matrix construction according to the present invention.

Referring to FIG. 11, shown therein is a partial block diagram of another of a sound source location device in accordance with the teachings of the present invention. In FIG. 11, a peak detection circuit (PDC) is utilized and PDC is a double-value signal processing device which converts the rise time, peak time value, etc. of the AE signal that has passed through the amplifier (AMP) which is a directional preamplifier into the rise time, pulse length, etc. of a pulse wave. A data generation circuit (DGC) is a device for converting the pulse output from the PDC into digital signals of several bits and the DGC has the function of preparing input information for the computer 9 in the next step. The computer 9 processes the information from the DGC appropriately and stores it in a disk, which is an external memory device.

The PDC mentioned above is installed for each of the x-channel and y-channel. The outputs of the PDC's are provided as an input to one computer 9 through the DGC. When an AE signal is generated, therefore, it receives PDC's x and y channels (produce information simultaneously). Thus, the computer information processing may follow the method shown in FIG. 9.

Next, an example of construction and the action of the PDC and DGC will be explained. Referring to FIGS. 12(A) and 12(B) shown therein is respectively a block diagram of the PDC and the shapes of the signal wave and the internal clock signal at both the input side and the output side of the PDC. The AE signal from the sensor 2 is first passed through AMP, which is a preamplifier, and then led into the first gate and the first comparitor. One of the standard terminals of the comparitor is supplied with a threshold voltage for the purpose of detecting the rise of the AE signal and this also controls the opening and closing of the first gate. When the AE signal reaches a designated voltage level (threshold voltage), the first gate opens and the AE signal is admitted into the peak hold circuit and a second comparitor. The peak hold circuit is a circuit for the purpose of maintaining the peak value of the input signal and its output is always supplied to the comparing terminal on one side of the second comparitor. The second comparitor receives the output signal from the gate on the other comparing terminal and when the signal from the first gate becomes smaller than the output signal from the peak holding circuit or when the AE signal reaches a peak value, the output of the second comparitor is supplied to the set terminal of a flip flop. At the same time, the constant current discharge circuit causes a discharge at the peak voltage level maintained in the peak hold circuit by means of a constant current drain and resets the flip flop at the point in time when the discharge value becomes zero. As a result, the setting time of flip flop is proportional to the peak voltage level of the AE signal.

On the other hand, since the first comparitor produces an output only when the AE signal is greater than the threshold voltage level, this period is identified by a pulse duration discriminator and a pulse of generally the width of the AF signal is supplied to the output terminal (2) and second gate as an open signal. The pulse output from the flip flop is sent to the output terminal (3) through a second gate when there is an output from the pulse duration discriminator. As a result of the above described structure and action, the output signals of the input terminal (1) and the output terminal (2) and (3) of the PDC become respectively like those shown in FIG. 12(B) (1), (2) and (3). In the FIG. 12(B), $t_r$ is the rise time of the AE signal, $t_f$ is the fall time, $t_d$ is the duration time and $t_p$ is the peak time. In summary, $t_d$ becomes the AE signal width and $t_p$ becomes the time width proportional to the peak value of the AE signal. Additionally, (B) (4) shown in FIG. 12(B) is the clock pulse.

Referring to FIG. 13, shown therein is a block diagram of the DGC. The DGC includes a first arrival detection circuit which is connected to a plurality of PDC output terminals (2) and waits for a signal from a first location (first hit) from any of the DGC's. when a first hit is detected, the flip flop is set, the register is put into a parallel signal input state by means of another control circuit (not shown) and the DGC waits for a signal from a PDC. A mono-multi (MM) 1-4 detects the rise and fall of the pulse shown in FIG. 12(B) and sends the pulse as an input to a register in the form of a pulse signal. The register is synchronized to the clock and records data corresponding to the pulse signal. At the same time, the register memorizes the channel code from the PDC. If THf, which is the output signal from the mono-multi (2) is later detected, the register assumes a serial output state and transfers its data stored inside to the memory register (Memory Reg). Later, this data in the Memory Reg will be outputted to the computer 9. Since the PDC and DGC acts as explained above, the data supplied to the computer is directly related to the synchronized wave of the AE signal generated within the indivdual channels. In other words, the rise and fall time of AE synthesized signal appearing in a channel as well as the rise and fall time of the pulse which is proportional to the peak level of the signal are supplied to the computer for each channel in which the AE signal has appeared. Accordingly, the computer can determine the signal generating channels which are the first, second and third locations as well as the generation times by appropriately processing the data so that the source of the AE generation can be determined.

Thus, in this example, a plurality of sensors distributed on the object are classified in rows and columns in such a way that the sensors which belong to a row and column are connected in parallel to a common terminal and interference among the sensors is eliminated by providing a directional element and that each row and each column is connected to one channel signal processing circuit. Therefore, according to this example, while a conventional device would have required a forty channel signal processing device with forty sensors, only 13 channels are required for the present invention. This enables a substantial simplification of the signal processing system.

Figure 14:
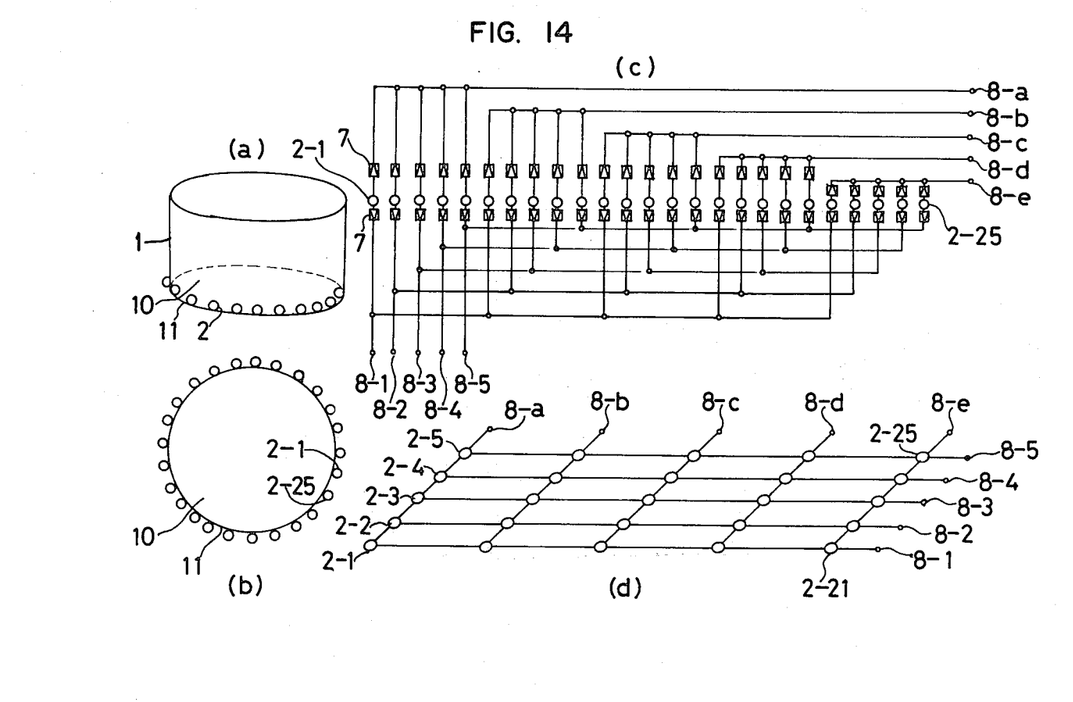
FIG. 14(A) shows a oblique view of a tank illustrating another example of the present invention.
FIG. 14(B) illustrates a plan view of the tank of FIG. 14(A)
FIG. 14(C) illustrates the connection of the sensors of this example.
FIG. 14(D) illustrates the connection to form a matrix.

Referring to the FIGS. 14(A), 14(B), 14(C) and 14(D), shown therein is another example of the present invention. In FIG. 14(A) is shown a diagonal view of the tank similar to the tank of FIG. 1, FIG. 14(B) illustrates a plan view of the tank with a base board 10, welding bead 11 for the base board 10 and side board 1, FIG. 14(C) illustrates a connection of the sensors 2 while FIG. 14(D) illustrates the matrix connection. This embodiment is for the purpose of determining the position of the AE generated from the welding bead 11 and twenty-five sensors 2-1 through 2-25 arranged along the welding bead 11 at appropriate intervals. The sensors are connected together in matrix form as shown in FIG. 14(C) and 14(D) and have common terminals 8-1 through 8-5 and 8-a through 8-e.

When the sensors are arranged in this manner, the scope of the AE generation source P can be determined by ascertaining which of the common terminals 8-a through 8-e are emitting detecting signals. Subsequently, by ascertaining the common terminals emitting detection signals from the first location and second location, it is possible to determine the sensors which received the signal in the first and second places. Finally, by calculating the time difference of detection between the two sensors from the phase difference of the two detection signals, the position of the AE generation P can be determined.

Figure 15:
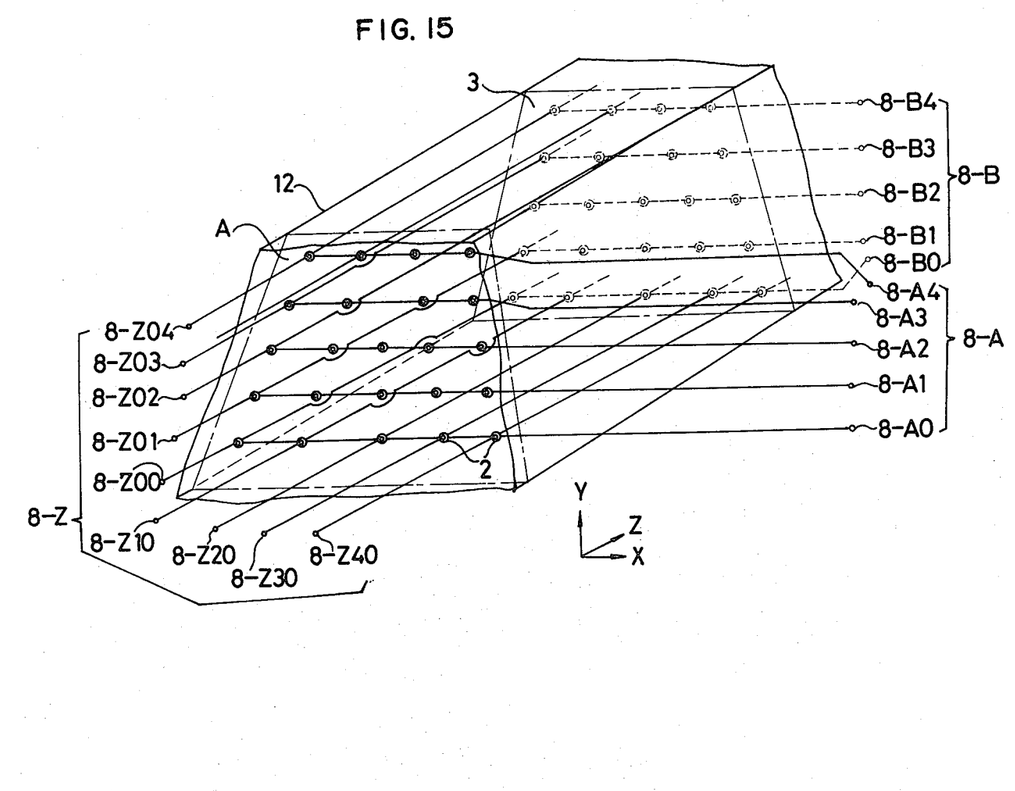
FIG. 15 is still another example of the present invention.

Referring to FIG. 15, shown therein is another example of the present invention showing a three dimensional distribution of the sensors for an object like an embankment and the way the sensors are connected.

For the purpose of illustration, only a portion of the distribution is shown and not all of the connections are illustrated. The sensors 2 are distributed inside the embankment 12 along the x,y and z axes at appropriate intervals. In this example two planes A and B are set up in the direction of the z-axis with an appropriate interval between them and twenty-three sensors classified in five rows and four to five columns respectively are distributed on these planes. These sensors are connected to one common terminal 8-Ai, 8-Bj for each row direction (the same y-coordinate) and a group of channels 8-A and 8-B is formed for each plane. Moreover, the sensors on plane A and the plane B having the same x and y coordinate are connected to one common terminal 8-xij to form a channel group 8-z. Each sensor is classified in this fashion, the channel group 8-A and 8-B formed a matrix corresponding to a row and the channel group 8-z formed a matrix corresponding to a column. If it is assumed now that an AE source P is located between the planes A and B, then, by ascertaining the common terminals which emit the detection signals in the first through third locations from the group 8-A0 through 8-A4 and 8-B0 through 8-B4, it is possible to determine the position of the AE generation source P along the z-axis and y-axis as the line common to two hyperpoloids. On the other hand, by determining the common terminals of the channel group 8-zij which emit detection signals in the first through third locations, it is possible to determine the position of the AE generation source P along the x-axis and the y-axis as the line common to hyperoloids. Thus, by combining the data above from the channel group 8-A and 8-B it is possible to determine the position of the AE generation source P three dimensionally.

In this example, only sensors distributed on two planes A and B are shown. In reality, it is common to use hundreds of planes. Consider, for example, a case where each plane contains 20 rows and ten columns and there are a hundred planes. If the number of required channels is calculated in this case (while the number of sensors which are distributed is $20 \times 10 \times 100 = 20,000$) the number of channels required is $20 \times 10 + 20 \times 100 = 2,200$. This means that the number of channels can be reduced to about one-tenth of the number of sensors.

Figure 16:
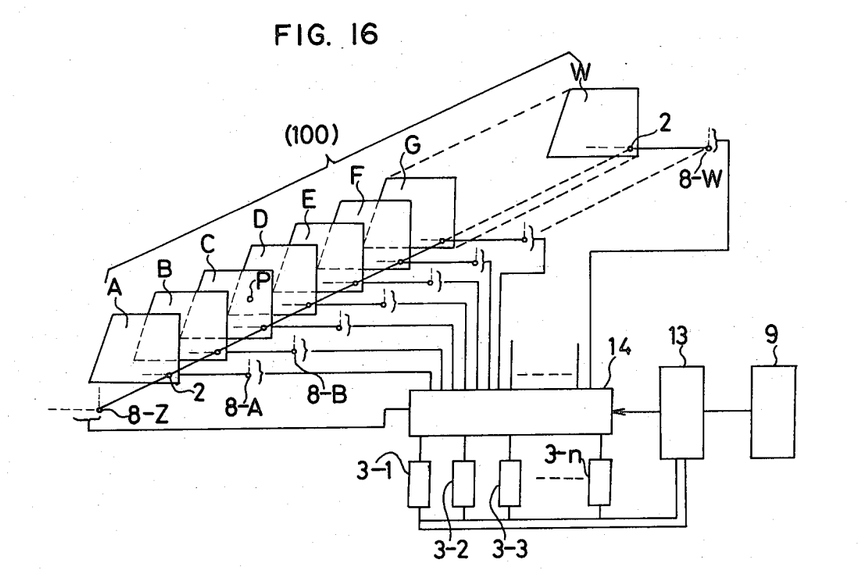
FIG. 16 is a block diagram of an example which illustrates further improvement of the present invention.

Referring to FIG. 16, shown therein is a block diagram of an example of a further improvement of the present invention. In the FIG. 16, A through W correspond to that which were shown as plane A and plane B in FIG. 15 and in FIG. 16 there is assumed to be 100 of these. For the sake of simplicity, only one sensor 2 is shown per plane. For the 5-channel common terminals extending in the x-direction from each plane, only one is shown per plane. For the twenty-three channel common terminals extending in the z-direction, 8-z only one of the common terminals is shown. The device of FIG. 16 includes a computer 13 (to be described as a CPU below), a switching circuit 14 which changes the connections between the extending terminals 8-A through 8-W and 8-z and the signal processing circuits 3-1 through 3-n by means of the CPU 13.

For the condition wherein the generation of an AE is being watched for, the twenty-three channel extended terminal 8-z for example, is connected in parallel with one signal processing circuit 3-1 while the other extended terminals 8-A through 8-W are connected in parallel with the remaining signal processing circuits 3-2 through 3-n in appropriate numbers. If we assume now that an AE takes place at a point P between the plane B and the plane C, the nearby sensors register the AE and an output will be transmitted to the signal processing circuits connected to the sensors. The CPU 13 compares the phase and the detection signals from the common terminals 8-z with that of the detection signals from the common terminals 8-A through 8-W. If the phases match, it is determined that an AE has been generated and the CPU 13 orders the switching circuit 14 to repeatedly scan together with the signal processing circuit 3-2 through 3-n while shifting from terminals 8-A to 8-z. If an AE is generated again from the AE source P while each plane is being scanned, the CPU 13 can ascertain that a detection signal has been transmitted from the common terminals 8-B and 8-C. Next, CPU 13 orders all terminals (ten terminals in this example) to connect the signal processing circuit 3 by one channel and all the common terminals of the z-axis 8-2 (twenty-three terminals in this example) to connect the signal processing circuit 3 by one channel. If the AE is generated from the AE generation source P under these circumstances, the CPU 13 functions in a way similar to the micro-computer in the above described embodiments to determine the sensor which detected the AE and its detection order. The CPU 13 also calculates the difference of detection time and transmits this information as an output to the recording device 9.

The number of channels required in the above example wherein there are a hundred planes from the plane A to the plane W in the example of FIG. 15 is calculated as 20×10+20×n. If n is chosen to be 5, the number of channels needed is 300. This means that a further substantial reduction in the number channels is possible in comparison with the case of the structure explained in FIG. 15.

Since the CPU 13 and the switching circuit are well known in the prior art and could be constructed utilizing prior art circuitry, a detailed explanation of their construction is omitted.

In the above example, the structure consists of a CPU 13 having within itself a program of sequences according to which, until AE generation first takes place, it looks for AE generation with many common terminals bunched together and connected to a one channel processing circuit. After the point in time when AE generation is detected, the CPU 13 waits for the next AE generation by scanning in such a way that a limited number of signal processing circuits are connected in turn through a switching circuit for each plane, which is controlled by the CPU 13, the CPU 13 ascertains the approximate position by detecting the next AE and afterwards waits for AE generation by connecting a one-channel signal processing circuit to the common terminals within a limited scope. It is equally within the scope of the present invention to watch for AE generation while constantly scanning the bunched common terminals. In such a configuration when an AE signal is detected, it is possible to identify the approximate area where AE source P is from this detected signal and then connect the signal processing circuit to each of the common terminals.

Furthermore, since AE is an ultrasonic wave of the order of several tens of KHz, it is possible to detect the necessary data for determining the position by scanning constantly and to record them by using a particularly fast switching device. It also becomes possible to make a practical device by applying it to a particularly large scale positioning device.

Each of the realized examples explained above were presented as a device for accurately locating the source of a sound on the basis of positions of signal receiving sensors, the order in which the signals are received by these sensors and the difference in times when the signals are received. However, the present invention is not limited to these examples. In the case of an embankment, etc. there are situations in which it is sufficient to identify the sensor which first received the signal and to conclude that the position of the source sound is within a detectable distance of the sensor (usually in the range of 1 to 5 meters) and situations in which it is sufficient to identify the first and second signal receiving sensors, concluding that the source of the sound is between these sensors. In such situations, a device for calculating the difference in the times of the signal reception is unnecessary.

Furthermore, in each of the realized examples explained above, the detected signals are converted into a pulse signal by means of a shape forming circuit, but the present invention is not limited by this requirement. It would also be possible to structure the present device such that a comparison is made of the phase of the peak value of the detected signal.

As is explained above, the present invention includes a procedure of addressing a plurality of sensors distributed on an object in such a way that a matrix with N rows and M columns is formed and the procedure of forming a system by connecting each sensor through an element having directionality to a common terminal for each row and each column and includes a means for comparing the detected signal emitted by the common terminal of each row and the detected signal emitted by the common terminal of each column, a means for detecting the row and column for which a detected signal with the same phase originated by identifying the sensor which transmitted the above described detected signal and a means of determining the order of receiving the sensor signals from the phase difference of the detected signal. Since a plurality of sensors belonging to rows and columns are connected to one channel signal processing circuit, it is possible to substantially reduce the number of channels necessary for signal processing. Since it is possible to reduce further the number of channels necessary for signal processing by controlling a high-speed switching device by means of a control device such as a computer having within itself a scanning program and by having it attached to a structure that connect to the signal processing circuits so as to scan the common terminals of each row and each column one after another, the present invention can be very effective when it is applied to a position determining device for a sound source where a particularly large number of sensors must be distributed.

It should be apparent to those skilled in the art that the above described embodiments and examples are merely but a few of the many possible specific embodiments and examples of the present invention. Numerous and varied other arrangements could be readily devised by those skilled in the art without departing from the spirit and scope of the invention.

I claim:

1. A device for detecting the position of a sound source comprising a plurality of sensors disposed on an object for which a source of sound is to be determined, a signal processing circuit which amplifies and carries out a designated output waveform generation process on detected signals produced by said sensors, and a means for identifying the order of detection by each sensor on the basis of the phase differences of said output waveform, said device being characterized in that:

said plurality of sensors are organized in the form of a matrix with N rows and M columns, all of said sensors in a given row being connected in parallel to a corresponding common terminal through respective uni-directional transmission elements, and all of said sensors in a given column being connected in parallel to a corresponding common terminal through respective uni-directional transmission elements;

said device further comprises a means for detecting among the outputs signals from said common terminal for each row and each column a signal with identical phase and a means for identifying the common terminal from which said identical phase signal was transmitted; and said device is capable of identifying a sensor which produces said detected signal from identification of the row and column which transmits said detected signal with identical phase;

whereby the position of said sound source may be determined from the position of each of said sensors and said order of detection.

2. The device according to claim 1, wherein said sensors are physically arranged along a line, said sensors are sectionalized into N successive groups of M sensors each, said sensors are classified in such a way that M subgroups are formed by picking successively one sensor out of each of said N groups and said sensors are connected together in such a way that a matrix with N rows and M columns is formed.

3. A device according to claim 1, wherein said plurality of sensors are physically distributed three dimensionally, said sensors are grouped into N groups of M each along an x-axis or a y-axis, said sensors being classified in such a way that M subgroups are formed by picking one sensor from each of said N groups which lie on the same z-axis and said plurality of sensors are connected together in such a way that a matrix with N rows and M columns is formed.

4. A sound source positioning device for determining the position of a sound source comprising a plurality of sensors disposed on an object for which the sound source is to be determined, a signal processing circuit which amplifies and carries out a designated output waveform generation process on detected signals produced by said sensors and a means for identifying the order of detection by each sensor on the basis of the phase differences of said output waveforms, said sound source positioning device being characterizied in that said plurality of sensors are organized in the form of a matrix with N rows and M columns, each of said sensors are connected in parallel for each row and each column through a uni-directional transmission element to a common terminal, said sound source positioning device also comprises a scanning device which scans systematically each of said common terminals of each row and each column and connects each row and each column to said signal processing circuit, a means for detecting among output signals from said common terminals of each row and each column a signal with identical phase, and a means for identifying a common terminal for which said signal with identical phase was transmitted, and said sound source positioning device is capable of identifying a sensor which produces said detected signal from the determination of the row and column which transmitted said detected signal with identical phase, whereby the position of said sound source may be determined from the position of each of said sensors and said order of detection.

5. A sound source positioning device according to claim 4, further comprising a switching device which can change the operation state of said sound source positioning device between a first state in which a preselected plurality of said common terminals are bunched together and connected to one said signal processing circuit and a second state wherein each of said preselected plurality of said common terminals are successively scanned, and a control device which controls said switching device to switch between said first and second states in accordance with a designated sequence.

* * * * *